Dec. 14, 1948.  A. G. SCHNEIDER  2,456,328
VARIABLE SPEED TRANSMISSION
Filed Feb. 27, 1941  2 Sheets-Sheet 1
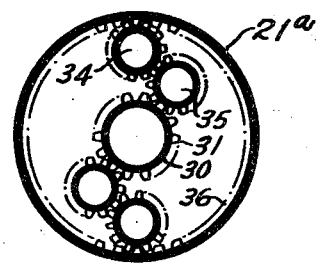
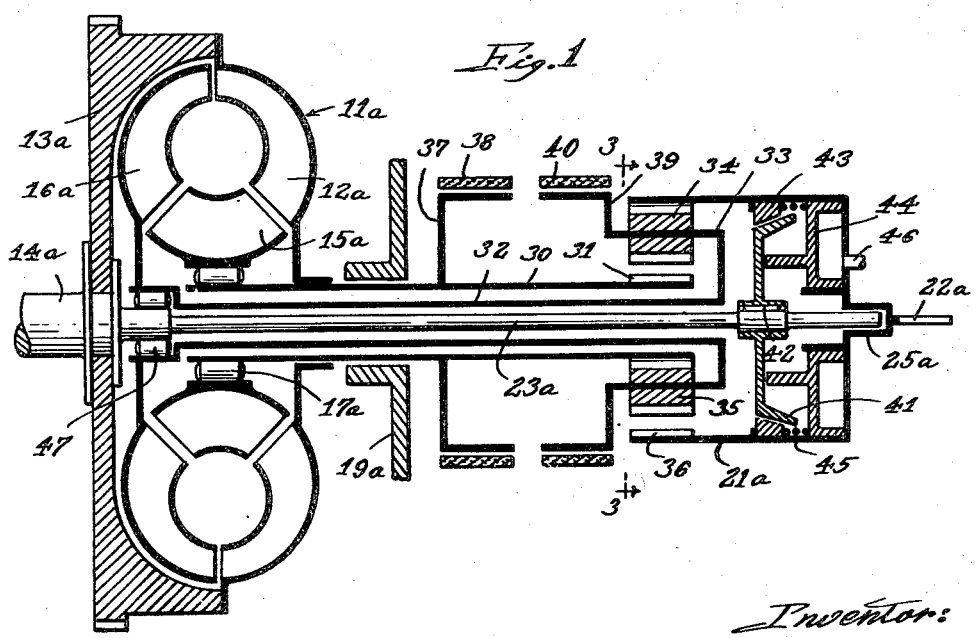
Inventor:
Adolf G. Schneider
By
McCanna, Wintercorn & Morebach
Attys.

Dec. 14, 1948.    A. G. SCHNEIDER    2,456,328
VARIABLE SPEED TRANSMISSION
Filed Feb. 27, 1941    2 Sheets-Sheet 2
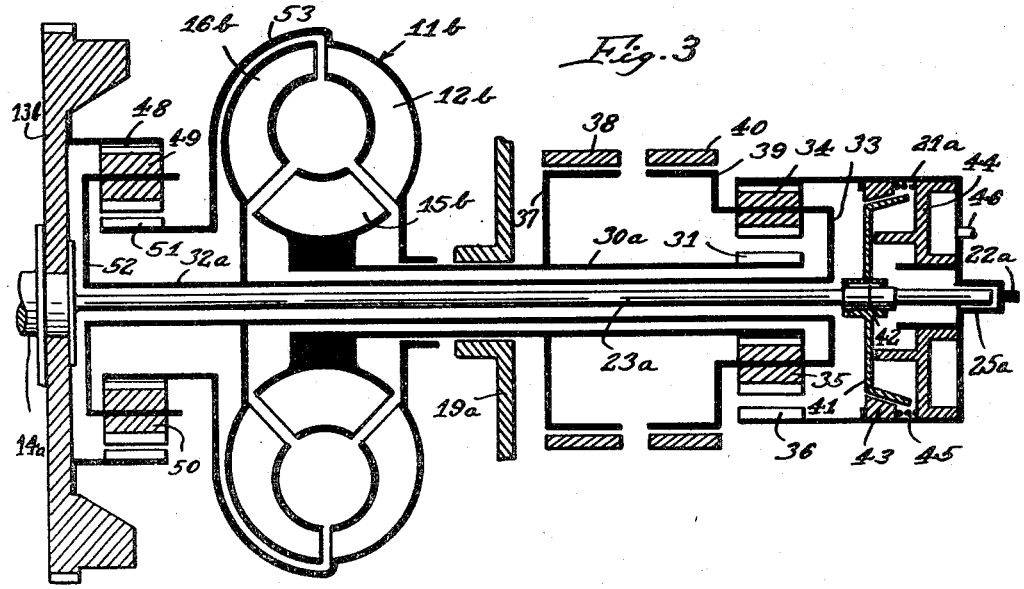
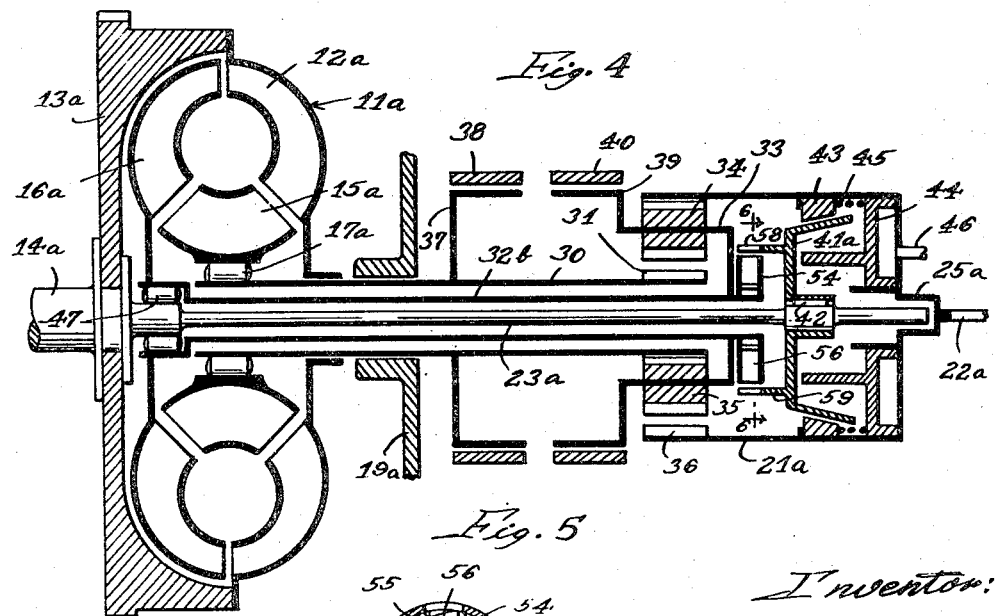

Patented Dec. 14, 1948

2,456,328

UNITED STATES PATENT OFFICE 2,456,328

VARIABLE SPEED TRANSMISSION

Adolf G. Schneider, Muncie, Ind., assignor, by mesne assignments, to Schneider Brothers Company, a copartnership composed of Heinrich Schneider and Viva Schneider, both of Hamilton, Ohio, and Adolf G. Schneider and Erna Schneider, both of Muncie, Ind.

Application February 27, 1941, Serial No. 380,792

28 Claims. (Cl. 74—189.5)

This invention relates to variable speed transmisisons and is more particularly concerned with improvements in transmissions of the kind disclosed in my copending application Serial No. 286,411, filed July 25, 1939, which resulted in patent No. 2,308,547, issued January 19, 1943, wherein Föttinger type hydraulic torque converters are combined with mechanical power transmitting means in order to obtain better operating characteristics than would be obtainable from either the hydraulic or mechanical means alone.

One of the principal objects of my invention is to provide a hydraulic transmission of the kind mentioned in which positive direct drive is obtainable with a simplified combination and arrangement of elements.

Another important object of the invention consists in the provision of brake means in the auxiliary drive gearing for selecting forward or reverse drive, while a clutch or coupling to obtain direct drive is provided in said gearing independently of the brake devices directly between the driven shaft and an extension of the driving shaft. The driving shaft extension, in accordance with my invention, is extended through concentric sleeves, the inner one of which turns with the turbine wheel and planetary gear cage and the outer one of which turns with the reaction member and the sun gear of the planetary gearing.

Another important object consists in the provision of a transmission of the kind just mentioned embodying a second planetary gear set between the driving shaft and the torque converter, whereby to obtain an inertia flywheel effect.

Still another important object of the invention consists in the provision of a transmission of the kind mentioned embodying a centrifugal coupling between the inner sleeve and the drive shaft extension, preferably cooperating directly with the direct drive clutch disk, whereby selectively to provide positive drive beyond the speed range of torque conversion in the converter.

In the accompanying drawings:

Figure 1 is a central longitudinal section in a more or less diagrammatic form through a transmission made in accordance with my invention;

Fig. 2 is a cross-section on the line 3—3 of Fig. 1;

Figs. 3 and 4 are views similar to Fig. 1 showing two other transmissions, and

Fig. 5 is a cross-sectional detail on the line 6—6 of Fig. 4.

Similar reference numerals are applied to corresponding parts throughout the views.

Referring to Fig. 1, the reference numeral 11a designates a Föttinger type hydraulic torque converter, the pump impeller 12a of which is connected to the flywheel 13a which turns with the driving shaft 14a. 15a is the reaction member and 16a the turbine wheel of the torue converter. At 17a is indicated a free-wheeling or overrunning clutch through which the reaction member 15a is connected to a sleeve 30 that extends through an opening in the wall of the stationary housing 19a. The turbine wheel 16a is connected to another sleeve 32 extending freely through the sleeve 30 for connection with the spider or cage 33 of the planetary gearing composed of a plurality of pairs of intermeshing planetary gears 34 and 35. 22a is the driven shaft and 23a is an extension of the driving shaft extending freely through the sleeve 32, the rear end of this extension being entered in a pilot bearing 25a on the front end of the driven shaft 22a. The sleeve 30, mentioned above, carries the sun gear 31 on the rear end thereof. The inner gear 35 of each pair of planetary gears meshes with the sun gear 31, and the outer gear 34 of each pair meshes with a ring gear 36 provided on the drum 21a attached to the front end of the driven shaft 22a. A brake drum 37 is provided on the sleeve 30, and a brake band 38 suitably supported against turning with respect to the housing 19a, similarly as disclosed in my copending application mentioned above, is adapted to be applied to the drum to prevent turning thereof. There is another brake drum 39 turning with the planetary cage 33 and a brake band 40 mounted in the housing 19a, similarly to the band 38, is adapted when applied to the drum 39 to prevent turning thereof. The shaft 23a, similarly to shaft 23, turns with the driving shaft, and in the present transmission this shaft has a cone clutch disk 41 splined thereon, as indicated at 42, whereby the same is adapted to be moved axially into engagement with a cone clutch ring 43 turning with the drum 21a. 44 is a hydraulically operable piston slidable in the drum 21a under oil pressure. This piston, which is normally held retracted under the action of a spring 45, is arranged to be moved toward the cone clutch disk under oil pressure, similarly as in the operation of the hydraulic clutch disclosed in my copending application. For the purposes of the present diagrammatic showing, 46 will serve to indicate the inlet for oil under pressure.

In operation, low speed drive is obtained by application of the brake band 38 to the drum 37 so as to hold the sun gear 31 and reaction member 15a stationary, the turbine wheel or runner 16a under these conditions transmitting drive to the planetary cage 33, whereby to drive the driven shaft 22a through the planetary gears 34—35 and ring gear 36 at a reduced speed but in the same direction as the shafts 14a and 23a, by reason of the use of planetary gears in pairs as indicated at 34—35 in Fig. 3, the reduction in speed depending upon the ratio of the sun gear 31 to the ring gear 36. The freewheeling clutch 17a holds the reaction member 15a against turning in the reverse direction relative to the turbine wheel 16a, but when the turbine wheel attains a speed approximately the same as the impeller 12a, the reaction member 15a will "float" and thus offer less resistance to the flow of the fluid. When the brake band 40 is applied to the drum 39 to hold the cage 33 against turning, there is reverse drive due to the fact that the reaction member 15a and sun gear 31 are free to turn in the opposite direction relative to the driving shaft 14a and thus transmit reverse drive to the driven shaft 22a through the planetary gears 34—35 and ring gear 36, a reduction in speed being obtained at a ratio determined by the ratio of the sun gear 31 to the ring gear 36, similarly as in low speed drive. In other words, I have taken advantage of inherent characteristics of hydraulic torque converters and have utilized the reaction member 15a as a turbine wheel or runner for reverse drive, the turbine wheel 16a under these conditions serving as the reaction member and being held stationary for that purpose with the planetary cage 33. Direct drive is obtainable when both brake bands 38 and 40 are released and the cone clutch 41—43 is engaged, thus locking the driving shaft 14a in direct drive relationship to the driven shaft 22a through the intermediate shaft 23a. The torque converter plays no part in this drive and there is accordingly no torque multiplication under these conditions. However, since the torque range of the converter alone is large enough to serve as a substitute for an ordinary three-speed passenger car transmission, the direct drive just described can easily replace the overdrive feature when used with a high rear axle ratio without impairing the acceleration characteristics. In passing, attention is called to the freewheeling or overrunning clutch 47 provided between the sleeve 32 and the shaft 23a. This is to permit using the engine as a brake in coasting when the direct drive clutch 41—43 is not engaged.

Figure 3 illustrates a transmission closely similar to that of Fig. 1 designed for vehicles in which reduction in space required and also in weight are essential or desirable. In this transmission, the flywheel 13b carries a ring gear 48 meshing with one of each of a number of pairs of planetary gears 49—50, the other gear 50 of each pair meshing with a sun gear 51. The gears 49—50 are carried on a cage 52 mounted on the front end of the sleeve 32a on which the turbine wheel or runner 16b is also carried, similarly as in Fig. 1. The sun gear 51 is connected, as indicated at 53, with the impeller 12b of the torque converter 11b, and the reaction member 15b is mounted on the front end of the sleeve 30a. The transmission is otherwise like that shown in Fig. 1 and the parts are numbered accordingly.

In operation, in starting from a standstill when the turbine wheel 16b is stationary, high speed driving of the impeller 12b relative to the turbine wheel 16b and reaction member 15b will permit the driven shaft 22a to carry a far greater load than would be permitted if the impeller 12b were driven at the same speed as the driving shaft 14a, as in the case of the impeller in the transmission of Fig. 1. As the turbine wheel 16b picks up speed, the ratio of the speed of the impeller 12b and the speed of the shaft 22a will progressively become smaller and the load carrying capacity of the impeller will also decrease. Hence this arrangement serves to prevent racing of the engine in starting the car. The fact that the impeller 12b can be driven at such greatly increased speed, the impeller 12b and sun gear 51 together with the connecting wall 53 constituting a floating rotor or inertia flywheel, in which energy must be stored during the starting period, permits the desired reduction in size and weight of the torque converter. This transmission operates otherwise in the same manner as that of Fig. 1.

Referring to Figs. 4 and 5, this transmission is the same as that shown in Fig. 1 in so far as the torque converter portion is concerned, and those parts have been numbered accordingly. The sleeve 32b on the front end of which the turbine wheel or runner 16a is mounted has a cylindrical enlargement 54 on the rear end thereof in which radial guides are provided for a pair of centrifugal pawls 56. The latter are normally held retracted by springs 57, but when the shaft 32b attains a predetermined speed these pawls move outwardly under centrifugal force toward engagement in slots or notches 58 provided in an annular rim 59 provided on the cone clutch disk 41a.

In operation, this centrifugal coupling will engage at a predetermined speed of the driven shaft 22a, where the torque conversion of the torque converter 11a is at an end and the converter is merely acting as a fluid clutch or coupling. The coupling 56—58 once engaged cannot be disengaged at any speed above its cut-in speed, but the direct drive clutch 41a can be disengaged at any speed. Release of the direct drive clutch above the cut-in speed of the centrifugal coupling puts the transmission in positive low speed drive. Release of the direct drive clutch below the cut-in speed of the centrifugal coupling puts the transmission in low speed fluid drive through the torque converter 11a. One may engage the direct drive clutch at any speed of the driven shaft 22a whether the centrifugal coupling is engaged or not. The operation of this transmission is otherwise the same as that disclosed in Fig. 1.

It is believed the foregoing description conveys a good understanding of the objects and advantages of my invention. The appended claims have been drawn with a view to covering all legitimate modifications and adaptations.

I claim:

1. A torque multiplying device comprising a driving shaft and a driven shaft, an impeller, a turbine rotatably mounted by means of a sleeve on an extension of the driving shaft, a planetary gear system connecting the turbine by means of said sleeve with the driven shaft, said planetary gear system comprising a sun gear and a ring gear and one or more pairs of intermeshed planetary gears between the sun gear and ring gear, one of each pair meshing with the sun gear and the other with the ring gear, the planetary gears being carried on a cage turning with said sleeve, said ring gear turning with the driven shaft, a brake drum carried by said sleeve, a brake means, means for applying the brake means to the drum, whereby the driven shaft may be caused to rotate in a direction opposite to the direction of rotation of the driving shaft, a second sleeve rotatably mounted on the first sleeve and having said sun gear turning therewith, a reaction member mounted on the second sleeve, a brake drum carried by the second sleeve, a brake means, means for applying the brake means to said drum, and clutch means for connecting the driving shaft extension directly with the driven shaft.

2. A torque multiplying device as set forth in claim 1, including an overrunning clutch mechanism between the driving shaft extension and the first sleeve permitting relative rotation between said shaft extension and sleeve in one direction only.

3. A torque multiplying device as set forth in claim 1, including an overrunning clutch mechanism between the reaction member and the second sleeve permitting turning of the reaction member relative to said sleeve in one direction only.

4. A torque multiplying device comprising a driving shaft and a driven shaft, an impeller, a turbine rotatably mounted by means of a sleeve on an extension of the driving shaft, a planetary gear system connecting the impeller with the driving shaft and comprising a sun gear turning with the impeller, a ring gear turning with the driving shaft, and planetary gears between the sun gear and ring gear carried on a cage turning with said sleeve, another planetary gear system connecting the turbine by means of said sleeve with the driven shaft, and comprising a sun gear and a ring gear and one or more pairs of intermeshed planetary gears between the sun gear and ring gear, one of each pair meshing with the sun gear and the other with the ring gear, the planetary gears being carried on a cage turning with said sleeve, said ring gear turning with the driven shaft, a brake drum carried by said sleeve, a brake means, means for applying the brake means to the drum, whereby the driven shaft may be caused to rotate in a direction opposite to the direction of rotation of the driving shaft, a second sleeve rotatably mounted on the first sleeve and having said second sun gear turning therewith, a reaction member mounted on the second sleeve, a brake drum carried by the second sleeve, a brake means, means for applying the brake means to said drum, and clutch means for connecting the driving shaft extension directly with the driven shaft.

5. A torque multiplying device comprising a driving shaft and a driven shaft, an impeller, a turbine rotatably mounted by means of a sleeve on an extension of the driving shaft, a planetary gear system connecting the impeller with the driving shaft and comprising a sun gear turning with the impeller, a ring gear turning with the driving shaft, and one or more pairs of planetary gears between the ring gear and sun gear carried on a cage turning with said sleeve, one of each pair meshing with the sun gear and the other with the ring gear, another planetary gear system connecting the turbine by means of said sleeve with the driven shaft, and comprising a sun gear and a ring gear and one or more pairs of intermeshed planetary gears between the sun gear and ring gear, one of each pair meshing with the sun gear and the other with the ring gear, the planetary gears being carried on a cage turning with said sleeve, said ring gear turning with the driven shaft, a brake drum carried by said sleeve, a brake means, means for applying the brake means to the drum, whereby the driven shaft may be caused to rotate in a direction opposite to the direction of rotation of the driving shaft, a second sleeve rotatably mounted on the first sleeve and having said second sun gear turning therewith, a reaction member mounted on the second sleeve, a brake drum carried by the second sleeve, a brake means, means for applying the brake means to said drum, and clutch means for connecting the driving shaft extension directly with the driven shaft.

6. A torque multiplying device comprising a driving shaft and a driven shaft, an impeller, a turbine rotatably mounted by means of a sleeve surrounding an extension of the driving shaft, a planetary gear system in which there are one or more pairs of intermeshed planetary gears between the sun gear and ring gear, one of each pair meshing with the sun gear and the other with the ring gear, for connecting the turbine by means of said sleeve with the driven shaft, a brake drum carried by said sleeve, a brake means, means for applying the brake means to the drum, whereby the driven shaft may be caused to rotate in a direction opposite to the direction of rotation of the driving shaft, a second sleeve rotatably mounted on the first sleeve, a reaction member mounted on the second sleeve, a brake drum carried by the second sleeve, a brake means, means for applying the brake means to said drum, and a centrifugal clutch responsive to the speed of rotation of the first-named sleeve for detachably connecting said sleeve and the driving shaft extension.

7. A torque multiplying device as set forth in claim 6, including an overrunning clutch mechanism between the driving shaft extension and the first sleeve permitting relative rotation between said shaft extension and sleeve in one direction only.

8. A torque multiplying device as set forth in claim 6, including an overrunning clutch mechanism between the reaction member and the second sleeve permitting turning of the reaction member relative to said sleeve in one direction only.

9. A torque multiplying device as set forth in claim 6, wherein the sun gear of said planetary gear system turns with the second sleeve, the ring gear of said planetary gear system turns with the driven shaft, and the one or more pairs of intermeshing planetary gears between the ring gear and sun gear are carried on a cage turning with the first sleeve.

10. A torque multiplying device comprising a driving shaft and a driven shaft, an impeller, a turbine rotatably mounted by means of a sleeve surrounding an extension of the driving shaft, a planetary gear system in which there are one or more pairs of intermeshed planetary gears between the sun gear and ring gear, one of each pair meshing with the sun gear and the other with the ring gear, for connecting the turbine by means of said sleeve with the driven shaft, a brake drum carried by said sleeve, a brake means, means for applying the brake means to the drum, whereby the driven shaft may be caused to rotate in a direction opposite to the direction of rotation of the driving shaft, a second sleeve rotatably mounted on the first sleeve, a reaction member mounted on the second sleeve, a brake drum carried by the second sleeve, a brake means, means for applying the brake means to said drum, engageable and releasable means for detachably connecting the driving shaft extension and the driven shaft, and a centrifugal clutch responsive to the speed of rotation of the first sleeve for detachably connecting said sleeve and the driving shaft extension.

11. A torque multiplying device as set forth in claim 10, including an overrunning clutch mechanism between the driving shaft extension and the first sleeve permitting relative rotation between said shaft extension and sleeve in one direction only.

12. A torque multiplying device as set forth in claim 10, including an overrunning clutch mechanism between the reaction member and the second sleeve permitting turning of the reaction member relative to said sleeve in one direction only.

13. A torque multiplying device as set forth in claim 10, wherein the sun gear of said planetary gear system turns with the second sleeve, the ring gear of said planetary gear system turns with the driven shaft, and the one or more pairs of intermeshing planetary gears between the ring gear and the sun gear are carried on a cage turning with the first sleeve.

14. A torque multiplying device, comprising a driving shaft and a driven shaft, an impeller, a turbine rotatably mounted by means of a sleeve surrounding an extension of the driving shaft, a planetary gear system for connecting the turbine by means of said sleeve with the driven shaft, comprising a cage turning with said sleeve carrying one or more pairs of intermeshed planetary gears between a sun gear and a ring gear, the latter turning with the driven shaft, one of each pair of planetary gears meshing with the sun gear and the other with the ring gear, a brake drum carried by said cage, a brake means therefor, means for applying the brake means to said drum to produce reverse drive of the driven shaft, a second sleeve rotatably mounted on the first sleeve and turning with the sun gear, a reaction member mounted on the second sleeve, a brake drum carried by the second sleeve, a brake means therefor, and means for applying the brake means to said last mentioned drum.

15. A torque multiplying device as set forth in claim 14, including an over-running clutch mechanism between the driving shaft extension and the first sleeve, permitting relative rotation between said shaft extension and sleeve in one direction only.

16. A torque multiplying device as set forth in claim 14, including an over-running clutch mechanism between the reaction member and the second sleeve, permitting turning of the reaction member relative to said sleeve in one direction only.

17. A torque multiplying device, comprising a driving shaft and a driven shaft, an impeller, a turbine rotatably mounted by means of a sleeve surrounding an extension of the driving shaft, a planetary gear system for connecting the turbine by means of said sleeve with the driven shaft, comprising a cage turning with said sleeve carrying one or more pairs of intermeshed planetary gears between a sun gear and a ring gear turning with the driven shaft, one of each pair of planetary gears meshing with the sun gear and the other with the ring gear, a brake drum carried by said cage, a brake means therefor, means for applying the brake means to said drum to produce reverse drive of the driven shaft, a second sleeve rotatably mounted on the first sleeve and turning with the sun gear, a reaction member mounted on the second sleeve, a brake drum carried by the second sleeve, a brake means therefor, means for applying the brake means to said drum, and a centrifugal clutch responsive to the speed of rotation of the first sleeve for detachably connecting said sleeve and the driving shaft extension.

18. A torque multiplying device as set forth in claim 17, including an over-running clutch mechanism between the driving shaft extension and the first sleeve, permitting relative rotation between said shaft extension and sleeve in one direction only.

19. A torque multiplying device as set forth in claim 17, including an over-running clutch mechanism between the reaction member and the second sleeve, permitting turning of the reaction member relative to said sleeve in one direction only.

20. A torque multiplying device, comprising a driving shaft and a driven shaft, an impeller, a turbine rotatably mounted by means of a sleeve surrounding an extension of the driving shaft, a planetary gear system for connecting the turbine by means of said sleeve with the driven shaft, comprising a cage turning with said sleeve carrying one or more pairs of intermeshed planetary gears between a sun gear and a ring gear turning with the driven shaft, one of each pair of planetary gears meshing with the sun gear and the other with the ring gear, a brake drum carried by said cage, a brake means therefor, means for applying the brake means to said drum to produce reverse drive of the driven shaft, a second sleeve rotatably mounted on the first sleeve and turning with the sun gear, a reaction member mounted on the second sleeve, a brake drum carried by the second sleeve, a brake means therefor, means for applying the brake means to said drum, and engageable and releasable means for detachably connecting the driving shaft extension and the driven shaft.

21. A torque multiplying device as set forth in claim 20, including an over-running clutch mechanism between the driving shaft extension and the first sleeve, permitting relative rotation between said shaft extension and sleeve in one direction only.

22. A torque multiplying device as set forth in claim 20, including an over-running clutch mechanism between the reaction member and the second sleeve, permitting turning of the reaction member relative to said sleeve in one direction only.

23. A torque multiplying device, comprising a driving shaft and a driven shaft, an impeller, a turbine rotatably mounted by means of a sleeve surrounding an extension of the driving shaft, a planetary gear system for connecting the turbine by means of said sleeve with the driven shaft, comprising a cage turning with said sleeve carrying one or more pairs of intermeshed planetary gears between a sun gear and a ring gear turning with the driven shaft, one of each pair of planetary gears meshing with the sun gear and the other with the ring gear, a brake drum carried by said cage, a brake means therefor, means for applying the brake means to said drum to produce reverse drive of the driven shaft, a second sleeve rotatably mounted on the first sleeve and turning with the sun gear, a reaction member mounted on the second sleeve, a brake drum carried by the second sleeve, a brake means therefor, means for applying the brake means to said drum, engageable and releasable means for detachably connecting the driving shaft extension and the driven shaft, and a centrifugal clutch responsive to the speed of rotation of the first sleeve for detachably connecting said sleeve and the driving shaft extension.

24. A torque multiplying device as set forth in claim 23, including an over-running clutch mechanism between the driving shaft extension and the first sleeve, permitting relative rotation between said shaft extension and sleeve in one direction only.

25. A torque multiplying device as set forth in claim 23, including an over-running clutch mechanism between the reaction member and the second sleeve, permitting turning of the reaction member relative to said sleeve in one direction only.

26. In a transmission, the combination of a driving shaft, a driven shaft, a hydrodynamic coupling device driven by said driving shaft, planetary gearing comprising sun and ring gear members, planet gears in mesh with said members and a carrier for said planet gears, means for connecting said hydrodynamic device and said carrier, one of said members being connected with said driven shaft and the other of said members being provided with a brake whereby the gearing functions to rotate said driven shaft at a different speed than the driven element of said coupling device, and a clutch for connecting directly said driving and driven shafts and providing a power train between the shafts independent of said coupling device.

27. In a transmission, the combination of a driving shaft, a driven shaft, a hydrodynamic coupling device driven by said driving shaft, planetary gearing including a sun gear, a ring gear, planet gears in mesh with the sun and ring gears, and a carrier for said planet gears, said carrier being connected with said hydrodynamic device and said ring gear being connected with said driven shaft, a brake for said sun gear, and a clutch for connecting directly said driving and driven shafts and providing a power train between the shafts independent of said coupling device.

28. In a transmission, in combination, a driving shaft and a driven shaft, a hydrodynamic coupling device including impeller, stator and driven elements, said impeller element being driven by said driving shaft, a first tubular shaft driven by the driven element, an extension on said driving shaft, said extension being encircled by said first tubular shaft, a second tubular shaft, said latter shaft being rotatably supported on said first tubular shaft and being connected with the stator element of said hydrodynamic coupling device, planetary gearing including a sun gear, a ring gear, planet gears in mesh with the sun and ring gears and a carrier for said planet gears, said carrier being connected with said first tubular shaft and said ring gear being connected with said driven shaft and said sun gear being connected with said second tubular shaft, a brake for said second tubular shaft, said planetary gearing permitting said driven shaft to be driven at a different speed than said driving shaft, and a clutch for connecting directly the extension on said driving shaft with said driven shaft.

ADOLF G. SCHNEIDER.

REFERENCES CITED

The following references are of record in the file of this patent:

UNITED STATES PATENTS

| Number | Name | Date |
| --- | --- | --- |
| 1,960,705 | Kochling | May 29, 1934 |
| 2,005,444 | Weiss | June 18, 1935 |
| 2,078,287 | Seibold | Apr. 27, 1937 |
| 2,102,634 | Lysholm | Dec. 21, 1937 |
| 2,144,074 | Maybach | Jan. 17, 1939 |
| 2,146,369 | Dodge | Feb. 7, 1939 |
| 2,176,105 | Schneider | Oct. 17, 1939 |
| 2,190,831 | Dodge | Feb. 20, 1940 |
| 2,196,585 | Gette | Apr. 9, 1940 |
| 2,224,884 | Schneider | Dec. 17, 1940 |
| 2,226,801 | Black | Dec. 31, 1940 |
| 2,226,802 | Black | Dec. 31, 1940 |
| 2,232,101 | Detork | Feb. 18, 1941 |
| 2,242,515 | Dodge | May 20, 1941 |